(12) United States Patent
Wachs et al.

(10) Patent No.: US 11,052,693 B2
(45) Date of Patent: Jul. 6, 2021

(54) MECHANICAL HANDWRITING APPARATUS AND METHOD OF USE THEREOF

(71) Applicants: David Wachs, Phoenix, AZ (US); Roxanne E. Abul-Haj, Sedona, AZ (US)

(72) Inventors: David Wachs, Phoenix, AZ (US); Roxanne E. Abul-Haj, Sedona, AZ (US)

(*) Notice: Subject to any disclaimer, the term of this patent is extended or adjusted under 35 U.S.C. 154(b) by 70 days.

(21) Appl. No.: 16/128,828

(22) Filed: Sep. 12, 2018

(65) Prior Publication Data

US 2020/0079129 A1    Mar. 12, 2020

(51) Int. Cl.
*B41M 5/00* (2006.01)
*B43L 13/10* (2006.01)
*B41J 11/00* (2006.01)

(52) U.S. Cl.
CPC .............. *B41M 5/00* (2013.01); *B41J 11/007* (2013.01); *B43L 13/10* (2013.01)

(58) Field of Classification Search
CPC ........... B41J 11/007; B41M 5/00; B43L 13/10
See application file for complete search history.

(56) References Cited

U.S. PATENT DOCUMENTS

| 2013/0082830 A1* | 4/2013 | Rosen | ..................... G06F 3/016 340/407.2 |
| 2020/0048024 A1* | 2/2020 | Nasu | ..................... B65H 43/00 |

* cited by examiner

*Primary Examiner* — Lamson D Nguyen
(74) *Attorney, Agent, or Firm* — Kevin H. Hazen; Hazen Patent Group, LLC

(57) ABSTRACT

The invention comprises a mechanical handwriting system linked to a user input system to generate a plotted document, such as a greeting card, note card or document, using a conveyor belt unit to support and move the document, a plotter, and a series of rollers to position and constrain movement of the greeting card, which is optionally and preferably linked to a paper feeder system in an assembly line format, where the rollers are optionally and preferably adjustable in position to accommodate varying paper sizes and to allow movement of the document during a plotting period to avoid positional overlap constraints of the rollers and a plotter head of the plotter in a process of plotting the document/card in sections.

10 Claims, 4 Drawing Sheets

MECHANICAL HANDWRITING APPARATUS AND METHOD OF USE THEREOF

BACKGROUND OF THE INVENTION

Field of the Invention

The invention relates generally to a handwritten card method and apparatus.

Discussion of the Prior Art

Patents related to the current invention are summarized here.

Loeb, Michael R., "Realistic Machine-Generated Handwriting with Personalized Fonts", U.S. Pat. No. 7,352,899 (Apr. 1, 2008) describes a system for producing machine generated handwriting having a realistic human appearance using a scanned representation of a person's handwriting.

Problem

There exists in the art a need for a personalized appearance of a machine generated printed and/or plotted document.

SUMMARY OF THE INVENTION

The invention comprises an automated mechanical handwriting system for plotting on documents, such as greeting cards, stickers, notes, and/or stationery, using a real pen or pen-like device.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a mechanical handwriting system linked to a user input system to generate a plotted document, such as a greeting card or note, using a conveyor belt unit to support and move the document, a plotter, and a series of rollers to position and constrain movement of the document, which is optionally and preferably linked to a paper feeder system in an assembly line format, where the rollers are optionally and preferably adjustable in position to accommodate varying paper sizes and to allow movement of the document during a plotting period to avoid positional overlap constraints of the rollers and a plotter head of the plotter in a process of plotting the card in sections, where the plotted document optionally and preferably contains an indentation trail emulating a downward force of a human hand writing on a deformable surface, such as a pad of paper.

Herein, an x-axis and a y-axis define a plane perpendicular to a z-axis, where the z-axis is optionally and preferably aligned with gravity.

Mechanical Handwriting System

Figure 1:
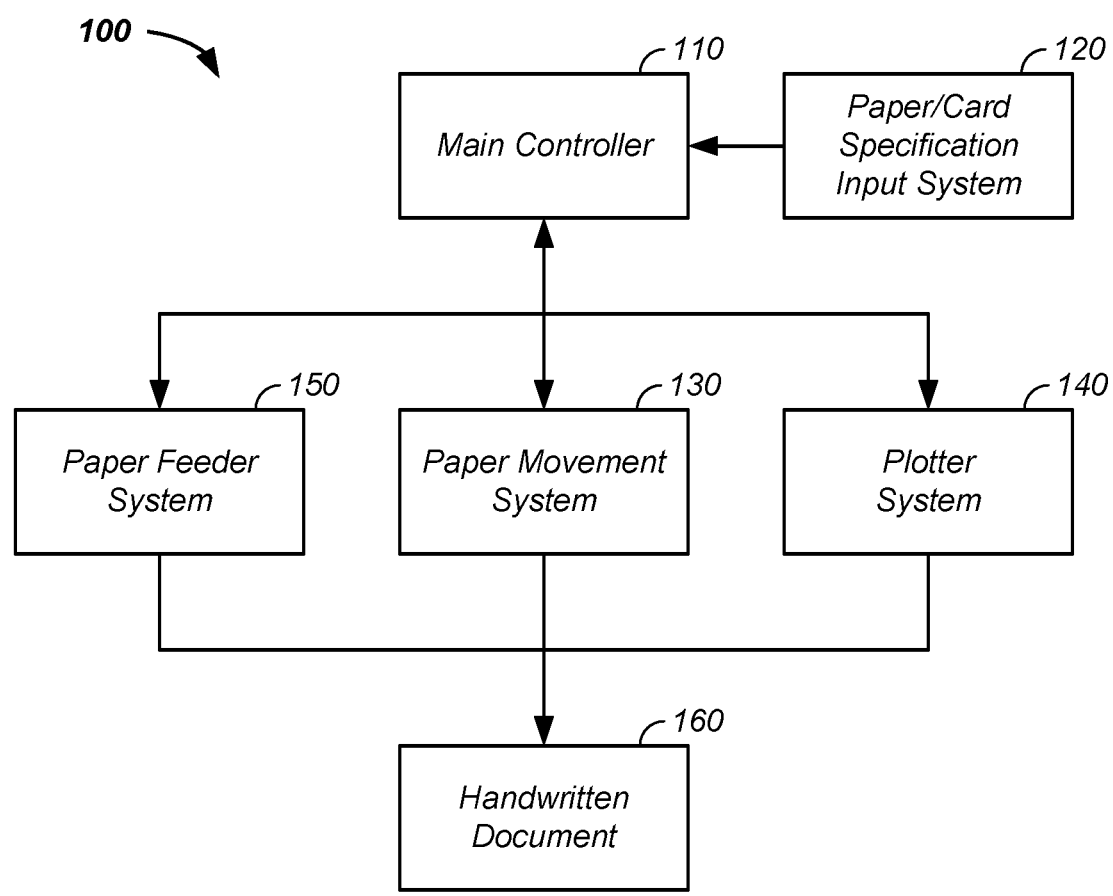
FIG. 1 illustrates a handwriting generation system.

Referring now to FIG. 1, a mechanical handwriting system 100 is described. Generally, the mechanical handwriting system 100 is used to generate a printed and/or preferably plotted document, such as a note card and/or a greeting card. For example, the mechanical handwriting system 100 comprises a system using mechanical means to emulate a handwritten card. The mechanical handwriting system 100 comprises a main controller 110 that:

receives and/or controls a paper specification input system 120, such as input specifying a desired appearance of a handwritten card;

controls a paper movement system 130;

controls a plotter system 140; and/or controls a paper feeder system 150, where an output of the mechanical handwriting system 100 comprises a printed and preferably plotted output document, such as a note, handwritten card, and/or a handwritten document 160. For clarity of presentation and without loss of generality a handwritten card as the plotted output/document is used as an example of the handwritten document 160. However, it is recognized that the plotted output optionally comprises: (1) any graphic, symbol, and/or text and/or (2) output plotted on any substrate, paper, and/or high quality paper, such as in the form of a decorated card, a greeting card, a sympathy card, a card expressing a sentiment, and/or a foldable card plotted on a front side, a back side, and/or a front and back side.

For clarity of presentation and without loss of generality, examples of the paper/card specification input system 120, the paper movement system 130, the plotter system 140, the paper feeder system 150, and the plotted output, such as the handwritten document 160, are provided, infra, to further describe the mechanical handwriting system 100.

Main Controller

Referring still to FIG. 1, the main controller 110 is further described. The main controller 110, a localized communication apparatus, and/or a system for communication of information optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input devices, such as a mouse, a keyboard, a display device, network input, a voice recognition system, a motion recognition system, or the like. Optionally and preferably, the processor of the main controller 110 is directly linked, wirelessly linked, and/or linked via the internet to a database or data entry system, such as the paper/card specification input system 120, further described infra. The processor is also communicatively coupled to an output device, such as a display screen or data link to display or send data and/or processed information, respectively. Optionally and preferably, the output device is a plotter system or a handwritten card system 200, further described infra. In one embodiment, the communication apparatus is the processor. In another embodiment, the communication apparatus is a set of instructions stored in memory that is carried out by the processor.

Referring still to FIG. 1, in one example the main controller 110 receives/transforms data from the paper/card specification input system 120 and controls: the paper movement system 130; the plotter system 140; the paper feeder system 150 and sub-components of each of the three systems in generation of the handwritten document 160.

Paper/Card Specification Input System

Referring still to FIG. 1, the paper/card specification input system 120 is further described. Generally, the paper/card specification input system 120 comprises any means to transfer input, such as from a client or user, into a digital format. For example, the paper/card specification input system 120 comprises a web page, where a user selects and/or inputs a desired input of a plotted document, such as a graphic, a symbol, font, and/or text. Optionally and preferably, the paper/card specification input system 120, such as the web page, allows the user to additionally select/define the format and/or relative positions of the graphic, symbol, font, or text.

Handwriting Generation System

Figure 2:
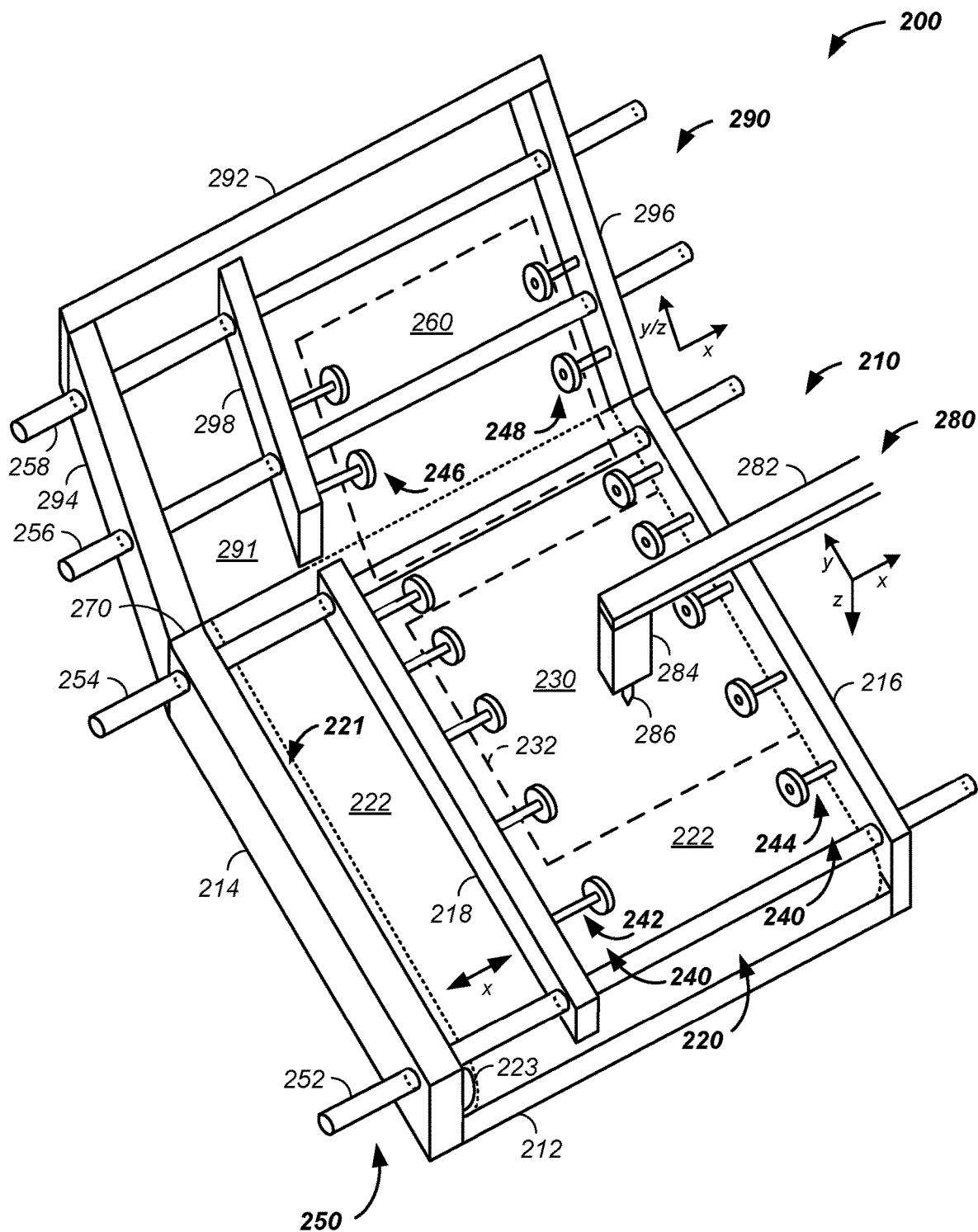
FIG. 2 illustrates a plotter system and a paper feeder system.
Figure 3:
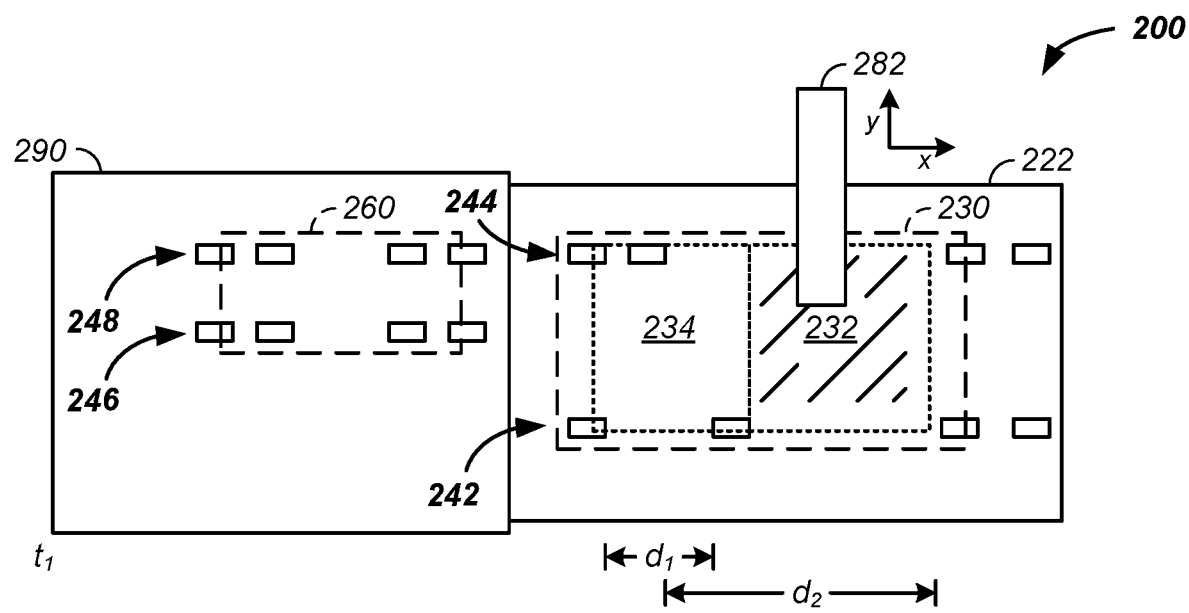
FIG. 3 illustrates a multi-section plotting system.
Figure 3:
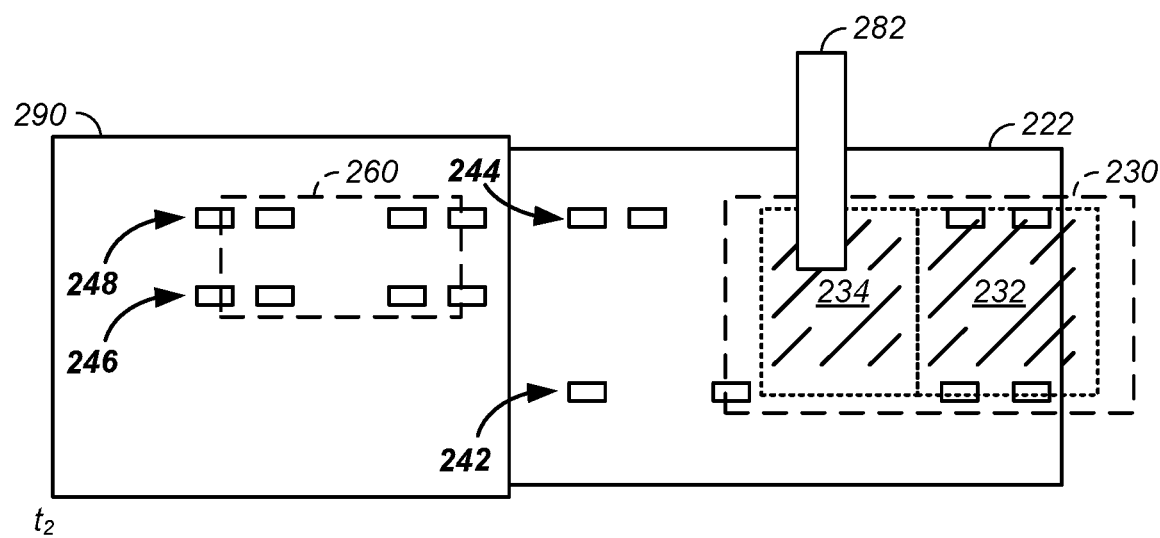
Figure 4:
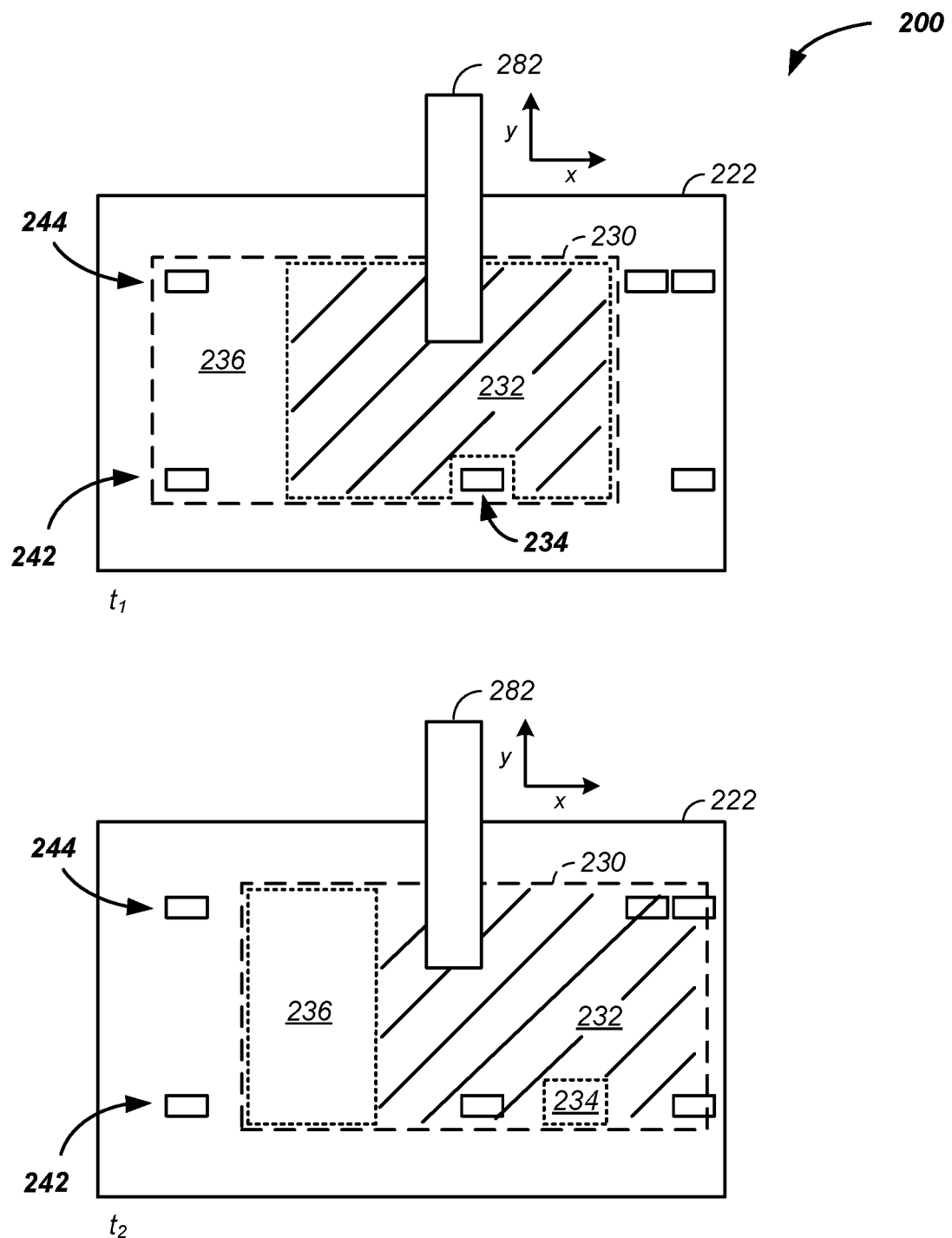
FIG. 4 illustrates a pressure applicator/feeder avoidance system.

For clarity of presentation and without loss of generating, referring now to FIGS. 2-4, a handwritten card system 200 is described, which is an example of the mechanical handwriting system 100. The handwritten card system 200 is linked to the main controller 110.

Paper Movement System

Referring still to FIG. 1 and referring now to FIG. 2, a paper positioning system 210 is described, which is an example of the paper movement system 130. The paper positioning system 210 comprises: a base unit 212, such as a unit placed onto a table; a first side rail 214 and a second side rail 216 on opposite sides of the base unit 212; and a conveyor belt system 220 positioned between the first side rail 214 and the second side rail 216, where the first and second side rails 214, 216 optionally and preferably support the conveyor belt system 220. The conveyor belt system 220 is functionally used to support and move a marking surface or a piece of paper 230, such as the greeting card or note, along a y-axis. A conveyor belt 222 of the conveyor belt system 220 rolls around conveyor belt wheels 223 driven by a motor or equivalent. Optionally, the conveyor belt 222 has a gap 221 between the conveyor belt 222 and the first and second side rails 214, 216. A plotter 280, further described infra, plots the graphic, symbol, and/or text with an associated font on the paper 230 supported underneath by the conveyor belt system 220.

Still referring to FIG. 2, the paper positioning system 210 optionally and preferably comprises a set of rollers 240, such as a first set of rollers 242 and a second set of rollers 244. As illustrated, each member of the first set of rollers are connected to a first intermediate rail 218, where the first intermediate rail 218 moves along the x-axis relative to the first side rail 214 and the second side rail 216 using one or more roller positioning guides 250, such as a first positioning rail 252 and a second positioning rail 254, where the positioning guides are optionally and preferably: (1) attached to the first intermediate rail 218 and (2) slide through the first and second side rails 214, 216. Mechanical means, not illustrated for clarity of presentation, connected to the main controller 110 and used to slide the first intermediate rail 218 along the x-axis, which allows the first set of rollers to be positioned over the paper 230, such as an outer edge of the paper 230, for a variety of paper sizes. Members of a second set of rollers 244 are optionally attached to the second side wall 216 and/or to a second intermediate rail, not illustrated for clarity of presentation, where each intermediate rail is positioned between the first and second side rails 214, 216 using one or more of the roller positioning guides. The first and second set of rollers 242, 244 are used to provide a downward force on the paper 230, which aids in restricting movement of the paper 230 when using the plotter 280 to mark on the paper 230 using the tip of a marking pen or a plotter pen 286. The downward force applied by the first and second set of rollers 242, 244 on the paper 230 also aids in positioning the paper 230 along the y-axis using movement of a conveyor belt of the conveyor belt system 220.

Still referring to FIG. 2, as a unit the paper positioning system 210 and the plotter 280, under control of the main controller 110 plot on the paper 230 the design/text/font provided by the paper/card specification input system 120.

Plotter System

Still referring to FIG. 2, a plotter 280, which comprises a component of the plotter system 140, prints and/or plots the graphic, symbol, and/or text and associated font on the paper 230 supported underneath by the conveyor belt system 220. The plotter 280 comprises a plotter arm 282, which is movable under control of the main controller 110 along the z-axis into or out of a plotting position and along the x/y-plane in plotting mode or to a plotting position. The plotter uses a connector 284 to position a marking pen, a traditional pen, plotting pen, and/or a plotter pen 286 comprising a pen tip into contact with the paper 230. The plotter system 140 is optionally and preferably configured with multiple marking elements, which comprise selectable tip sizes, selectable tip shapes, and/or selectable ink color. Optionally and preferably, the downforce on the pen is one to twelve ounces and more preferably greater than three and less than nine ounces. The downforce includes the weight of the pen, weight of a weighted pen, and/or an applied force, such as a spring force acting on the marking pen and/or plotter arm 282.

Handwritten Marking Indentation

A handwritten note by a person typically leaves an indentation trail under the handwritten text, due to the applied pressure of the user writing with a pen on a surface that yields, such as a pad of paper, blotter, backboard, or wood desk. Still referring to FIG. 2, the handwritten card system 200 optionally and preferably mimics the indentation of a person handwriting and leaving marking indentations on paper using a combination of properties of the conveyor belt 222 and the plotter 280. More particularly, the conveyor belt 222 comprises a material designed to yield under pressure of the plotter pen 286 of the plotter system 280 to a degree that yields a handwritten pressure trail under the handwritten elements made by the marking pen or plotter pen 286. For example, the conveyor belt 222 comprises a thin belt of polyurethane, which is a soft material that, in combination with the above described downward force of the pen of about six ounces leaves marking indentations and/or a marking trail that mimics the indentation trail of a personally written note on a pad of paper that yields under the applied force of a pen. The polyurethane belt additionally has friction properties that aids, such as in combination with the set of rollers 240 and/or the downward force of the marking pen, in holding the paper or greeting card in place while the conveyor belt 222 moves and/or the plotter 280 operates. The indentation trail, on the marking document, backed by said deformable surface using said downward force of said plotting pen is optionally and preferably greater than 0.01, 0.1, 1, 2, 3, 5, or 7 micrometers deep and/or less than 1, 2, 5, 10, 25, 50, or 100 micrometers deep, relative to an upper plane of a marking side of the marking document or paper. The indentation trail, trough, or channel, is optionally and preferably continuous through a plotting stroke, such as the downstroke of the letter "S", described infra, while within a plotting stroke, the depth is optionally non-uniform, such as deeper at an initial contact point of the marking pen and a surface of the marking document.

Maintenance

Still referring to FIG. 2, a standard ink refill cartridge is optionally and preferably used as the pigment source inside a housing of the marking pen or plotter pen 286. Optionally, the main controller 110 maintains a total distance that the pen has marked and directs a replacement cartridge installation after a set distance, such as 1000, 2000, 4000, 6000, or more feet based on the ink cartridge capacity.

Paper Feeder System

Referring again to FIG. 1 and still referring to FIG. 2, the paper feed system 150 is further described. For clarity of presentation and without loss of generality, a paper feed assembly 290 is provided as an example of the paper feed system 150, which is connected to the paper positioning system 210 during use to automatically feed a next substrate unit, such as a piece of paper to the conveyor belt 222. The paper feed assembly 290 optionally and preferably comprises a base unit 291 and/or an end unit 292, which separates a first edge rail 294 and a second edge rail 296. Similar to the first intermediate rail 218, first set of rollers 242, and second set of rollers 244 of the paper positioning system 210, the paper feed assembly 290 uses a second intermediate rail 298, third set of rollers 246, and fourth set of rollers 248 to move, under control of the main controller 110, a new feed sheet 260 onto the conveyor belt 222 to become a new paper 230, such as for production of a new handwritten document 160. Similar to the movement of the first intermediate rail 218 with movement of the first and second positioning rails 252, 254, the second intermediate rail 298 moves with a third positioning rail 256 and a fourth positioning rail 258 relative to the first edge rail 294 and the second edge rail 296. Movement of the second intermediate rail 298, optionally under control of the main controller 110, moves the third set of rollers 246 relative to the fourth set of rollers 248, which allows each new feed sheet 260 to be of any dimension fitting between the first edge rail 294 and the second edge rail 296. Optionally and preferably, the paper feed assembly 290 is parallel to the paper positioning system 210 in terms of the x-axis and the base unit 291 is set at a downward angle along a y/z-plane to facilitate movement of the new feed sheet 260 to the conveyor belt 222 of the paper positioning system 210.

Plotting

Referring now to FIG. 3, for clarity of presentation and without loss of generality an example of printing or preferably plotting the handwritten document 160 is described. At a first time, $t_1$, a first plot section 232 of a greeting card, an example of the paper 230, is plotted. As illustrated, the plotter arm 282 can freely move over the first plot section 232. However, with the paper 230 in a first illustrated position at the first time, $t_1$, the plotter arm 282 is impeded by members of the first set of rollers 242 when trying to plot a second plot section 234. At a second time, $t_2$, the main controller 110, through control of the conveyor belt 222, has moved the paper 230 to a second position where the plotter arm 282 can freely move over the entire second plot section 234. Generally, any number of plot sections are used, such as n plot sections, where n is a positive integer, such as greater than 1, 2, 3, 4, 5, 6, 8, or 10.

Referring again to FIG. 2 and referring still to FIG. 3, the set of rollers 240 are further described. Any of the members of the first set of rollers 242 are repositionable in grooves in the first intermediate rail 218, which allows a variable first distance, $d_1$, between a first and second member of the first set of rollers 242. Similarly, any of the members of the second set of rollers 244 are repositionable into slots in the second side rail 216 allowing a second variable distance, $d_2$, between any two members of the second set of rollers 244. Notably, the first distance between rollers, $d_1$, is optionally less than, the same as, or greater than the second distance between rollers, $d_2$. Generally, the variable position between rollers and the ability to plot the document, such as a greeting card, using 1, 2, 3, 4, or more plot sections, described supra, allows the plotter arm 282 to access any portion of the paper 230.

Referring now to FIG. 4, another example of use of the mechanical handwriting system 100 is provided, which demonstrates plotting in multiple plot sections at multiple plot times where the number of plot sections differs from the number of plot times. As illustrated, at a first time, $t_1$, the plotter arm 282 is used to plot a first plot section 232 and at a second time, $t_2$, the plotter arm 282 is used to plot both a second plot section 234 and a third plot section 236. Generally, each plot section is of any geometry; two plot sections are optionally non-intersecting or intersecting; and multiple plot sections are optionally and preferably used to avoid an interfering object, such as one or more rollers of the set of rollers 240.

Referring again to FIG. 3 and still referring to FIG. 4, as illustrated the paper 230 is held in a given position on the conveyor belt 222 using any combination of: friction of the polyurethane conveyor belt; downward force of the marking pen 286; any 1, 2, 3, or more rolling elements of the first set of rollers 242; and any 1, 2, 3, or more rolling elements of the second set of rollers 244.

The inventor notes that modern fonts, such as TrueType® (Apple Inc., Cupertino, Calif.); OpenType® (Microsoft Corporation, Redmond, Wash.); and PostScript® (Adobe Systems, Inc., San Jose, Calif.), which are used in word processing programs, use an outline for each character/symbol to represent each character/symbol, which starkly contrasts with an output of the handwriting system 100, which uses single line representation of character strokes in each character, where the character strokes are within the modern font representation, such as down a centerline, along a left edge, a right edge, or a modern font perimeter boundary for each character symbol. The inventor notes that by definition a font is an outline and that the mechanical handwriting system 100 optionally and preferably plots a representation of the font. For example, a font of the letter "S" is a downward curve from top to bottom and a separate upward curve from bottom to top of the "S". However, the main controller direct the plotter 210 to only draw one of the two curves forming the letter "S", a midline between the downward curve and the upper curve, or any non-outline representation of the "S".

Still yet another embodiment includes any combination and/or permutation of any of the elements described herein.

The main controller client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C #, Visual Basic® (Microsoft, Redmond, Wash.), Matlab® (MathWorks, Natick, Mass.), Java® (Oracle Corporation, Redwood City, Calif.), and JavaScript® (Oracle Corporation, Redwood City, Calif.).

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for using a machine to produce a handwritten appearance of input text on a marking surface, comprising the steps of:
   backing the marking surface with a conveyor belt, said conveyor belt comprising a deformable surface;
   machine plotting the input text on the marking surface using a plotting pen with a downward force of one-half to forty ounces; and
   generating an indentation trail on the marking surface backed by said deformable surface using said downward force of said plotting pen.

2. The method of claim 1, further comprising the steps of:
   generating a mechanically produced handwritten document using said steps of backing, machine plotting, and generating; and
   moving the mechanically produced handwritten document through movement of said conveyor belt to at least a second plotting position during said step of generating the mechanically produced handwritten document.

3. The method of claim 2, further comprising the step of:
   generating said downward force through a combination of a downward spring force applied to said plotting pen and a weight of said plotting pen.

4. The method of claim 3, further comprising the step of:
   using a set of rollers to maintain a position of the mechanically produced handwritten document relative to a contact surface area of said conveyor belt during said step of moving.

5. The method of claim 3, further comprising the step of:
   feeding a new sheet onto said conveyor belt using a mechanical paper feeder.

6. The method of claim 5, further comprising the step of:
   using a controller and a motor in repositioning at least one member of said set of rollers to accommodate a change of size between the new sheet and the marking surface, said marking surface comprising paper.

7. The method of claim 1, said step of generating an indentation trail further comprising the steps of:
   a main controller receiving a requested text and a traditional outline font; and
   plotting a line representation of the traditional outline font of the input text on the mechanically produced handwritten document.

8. The method of claim 7, further comprising the steps of:
   said conveyor belt, comprising a polyurethane belt, providing friction against slippage of the mechanically produced handwritten document relative to said conveyor belt; and
   said polyurethane belt deforming sufficiently under said one-half to forty ounces of downward force to form said indentation trail corresponding to the line representation of the input text, said indentation trail emulating hand written indentation on a notepad.

9. The method of claim 7, further comprising the steps of:
moving the plotting pen along an axis within twenty degrees of an axis aligned with gravity into a marking position; and
said main controller determining cumulative miles of travel of said plotting pen in said marking position.

10. The method of claim 1, further comprising sequential steps of:
plotting text on a first position of the marking surface at a first time;
moving the marking surface using the conveyor belt to a new position relative to an end of said conveyor belt; and
plotting text on a second position of the marking surface at a second time, said second position inaccessible by said plotting pen at said first time.

\* \* \* \* \*